United States Patent
Tiberio

[15] 3,653,228
[45] Apr. 4, 1972

[54] PROGRESSIVE CLUTCH

[72] Inventor: Giuseppe Tiberio, 2102 Kennedy Boulevard, Union City, N.J. 07087

[22] Filed: Nov. 12, 1970

[21] Appl. No.: 88,866

[52] U.S. Cl. .................................................. 64/26
[51] Int. Cl. ............................................. F16d 3/80
[58] Field of Search ........................................ 64/26

[56] References Cited

UNITED STATES PATENTS 3,212,294  10/1965  Burnett et al. ..................... 64/26
3,322,212  5/1967   Pauley ............................ 64/26 X

FOREIGN PATENTS OR APPLICATIONS 561,811  6/1944  Great Britain ........................ 64/26

*Primary Examiner*—Edward G. Favors
*Attorney*—Polachek & Saulsbury

[57] ABSTRACT

A coupling device for progressively, gradually and shocklessly coupling a rotary drive shaft and driven shaft, comprising a flat, cup-shaped impeller member with a disc shaped impelled member rotatably disposed therein. Jaws on the impeller member and impelled member are disposed in fluid filled first and second chambers inside the impeller member. A narrow bore in one jaw passes fluid from the first chamber to the second chamber when the impeller member starts rotating. A passage containing a check valve passes fluid in one direction from the second chamber to the first chamber when the impeller member stops rotating. A coil spring connected between the impelled and impeller members returns the jaws to initial angular position. A laterally weighted ring balances the jaws when rotating together. Two jaws can be provided on each of the impeller and impelled members for cooperative action.

11 Claims, 8 Drawing Figures

INVENTOR.
GIUSEPPE TIBERIO
BY Polachek & Saulsbury
ATTORNEYS

INVENTOR.
GIUSEPPE TIBERIO

INVENTOR.
GIUSEPPE TIBERIO
BY
Polachek & Saulsbury
ATTORNEYS

PROGRESSIVE CLUTCH

The present invention concerns a device for coupling and decoupling a rotary drive shaft or clutch and a driven shaft gradually, progressively and shocklessly.

It has been known heretofore that when mechanical clutches engage they transmit a shock on closure between the drive and driven shafts. Even with fluid clutches such as used in automatic transmission systems of automobiles, it has been noted that there is considerable shock when the transmission shifts from gear to gear. The continual strain on the parts causes failure of clutch parts, breakage of planetary gears, breakdown of transmissions, etc.

The present invention is directed at overcoming this difficulty by providing a coupling device which progressively engages a motor driven shaft or other driving part to a driven shaft. By accomplishing gradual progressive engagement of the drive and driven shafts mechanical shock is eliminated and the parts couple and decouple smoothly and gradually.

It is therefore a principal object of the invention to provide a coupling device for producing progressive, shockless coupling between a rotary drive shaft and a rotary driven shaft.

Another object is to provide a progressive coupling device which is adapted for use between a conventional motor driven clutch and a driven rotary shaft.

Another object is to provide a coupling device between drive and driven shafts comprising a cup-shaped impeller member in which is a rotatable impeller member, both members carrying angularly spaced coplanar jaws which are relatively moveable in chambers containing fluid to drive fluid from one chamber to the other via a narrow bore in one jaw, and to drive fluid in reverse direction via a passage containing a check valve in the same jaw.

Another object is to provide a coupling device as described, with a spiral spring connected between the impeller member and impelled members to restore the jaws to initial angular position when driving force on the impeller member is relieved.

Other and further features, objects and advantages of the invention will become apparent from the following detailed description taken together with the accompanying drawings, wherein.

Figure 1:
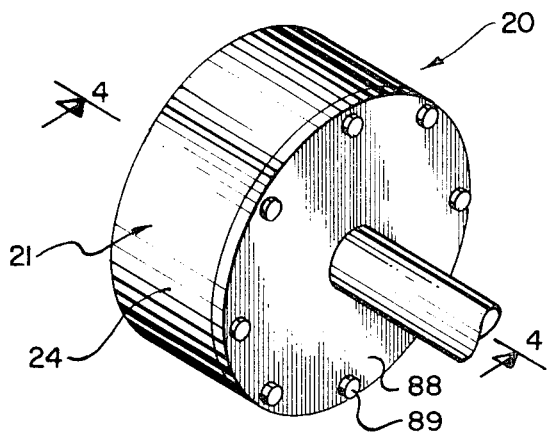
FIG. 1 is a perspective view of a coupling device embodying the invention, showing the side and one end of the device.

Referring first to FIGS. 1–7, there is shown a progressive coupling device 20, embodying the invention. The device includes an impeller member 21 comprising a circular impeller disc 22, a peripheral cylindrical skirt 24 and a central hub 26. A drive member 27 such as a motor driven clutch, drive shaft or the like can be secured to the outer side of disc 22 and/or to hub 26 in any suitable manner, such as by welding or bolts. On the inner side of disc 22 is a flat, integral, sector shaped jaw 28. Disc 22 has an axial recess 30 formed with a circumferential groove 32. This groove receives an O-ring 34. The O-ring engages in a groove 36 formed in stub shaft 38 of impelled member 40.

The impelled member 40 includes a circular disc 42 with a flat, integral sector shaped jaw 44 formed thereon on the side facing disc 22. The impelled member is rotatably seated inside impeller member 21. The jaws 28 and 44 are disposed in the same plane so that rotation of the impeller and impelled members with respect to each other is limited to an angle of about 250°, or more according to the size of the jaws.

Chambers 50 and 51 are defined between the facing sides of discs 22 and 44. The chambers can be filled with fluid 52 through a hole 54 closed by a plug 56 in skirt 24. A narrow bore or hole 58 is formed in jaw 44 and extends through the jaw between opposite lateral sides 60, 62. This hole is located near stub shaft 38. A one-way check valve 64 is located in another wider bore or passage 66 spaced radially from hole 58 and located near the radially outer end of jaw 44. Passage 66 extends between opposite sides 60, 62 of jaw 64. The valve permits passage of fluid 52 in only one direction from side 62 to side 60 of the jaw, i.e., from chamber 51 to chamber 50. The valve is normally held closed by a spring 68 bearing on ball 70 of the valve.

Chambers 50 and 51 are sealed by a sealing ring 72 having an inner hole 74 engaged on axial hub 75 of impelled member 40. Hub 75 extends axially away from the disc 42. The hub 75 and hole 74 have opposing grooves 76, 78 in which is engaged sealing ring 80. Another sealing ring 82 is engaged between circumferential grooves 84, 86 formed inside of skirt 24.

The free end of skirt 24 is closed by a plate 88 secured in place by bolts 89 engaged in threaded holes 90 in the end of skirt 24. Between plate 88 and plate 72 inside the impeller member is defined another chamber 92. In this chamber is a coil spring 94 and a massive split ring 96.

Figure 5:
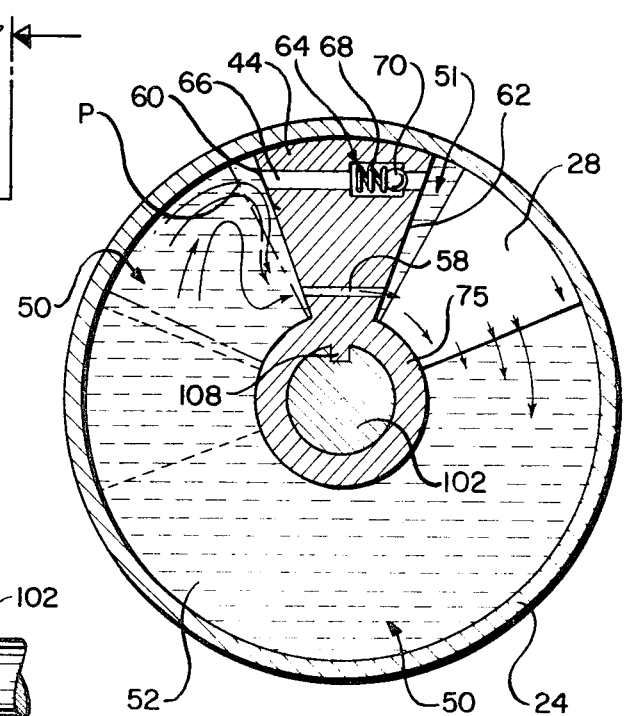
FIG. 5 is a reduced cross sectional view taken on line 5—5 of FIG. 4, showing the impeller and impelled members in a starting position.
Figure 7:
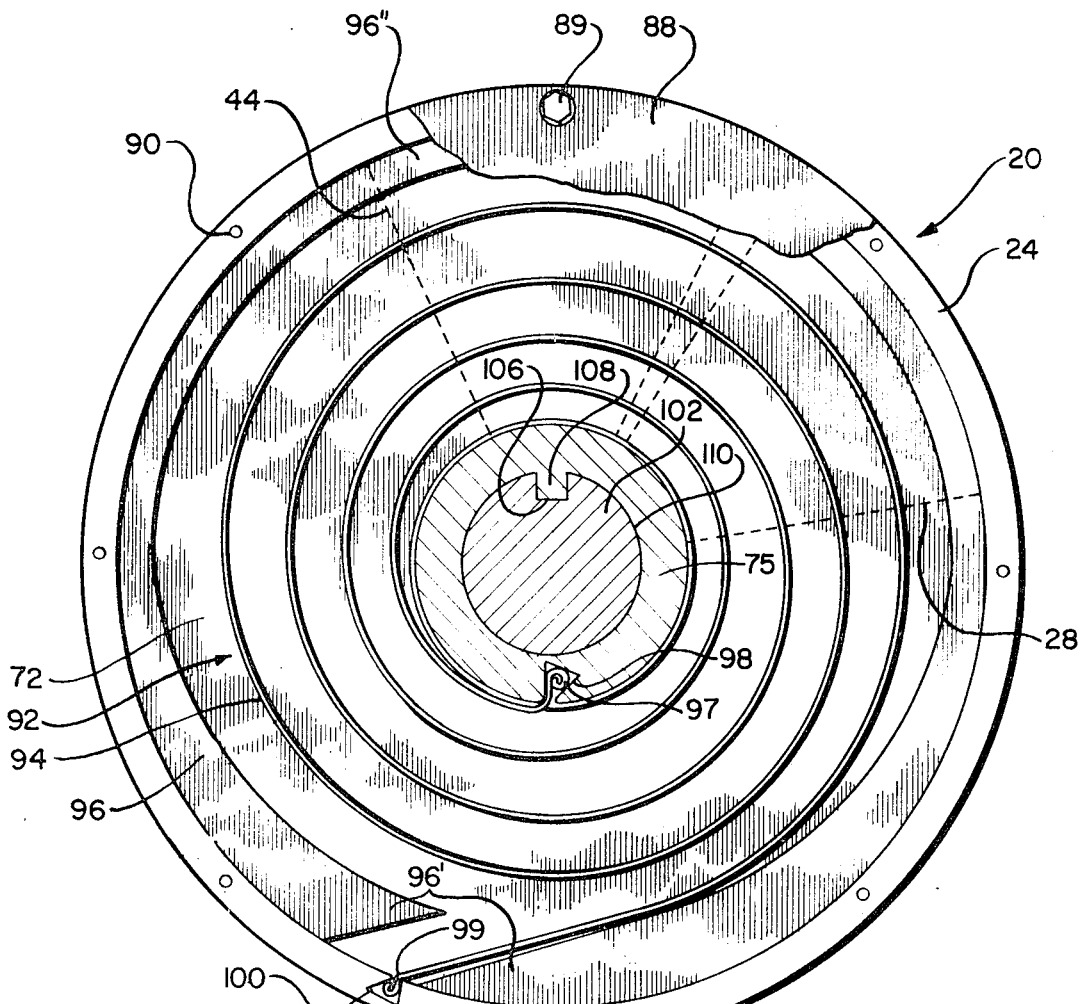
FIG. 7 is a cross sectional view taken on line 7—7 of FIG. 4.

The inner end 97 of the spring engages in a dovetail slot 98 in hub 75; see FIG. 7. The outer end 99 of the spring engages in a dovetail slot 100 formed on the inside of skirt 24. An outer end portion of the spring passes between spaced ends of split ring 96 as shown in FIG. 5. The end portions 96' of ring 96 are thicker and more massive than the diametrically opposite portion 96" of the ring to balance the weight of jaws 28 and 44 on single type jaw. The thicker parts of ring 96 are disposed diametrically opposite from jaws 28 and 44 when they are juxtaposed and rotate together.

Figure 2:
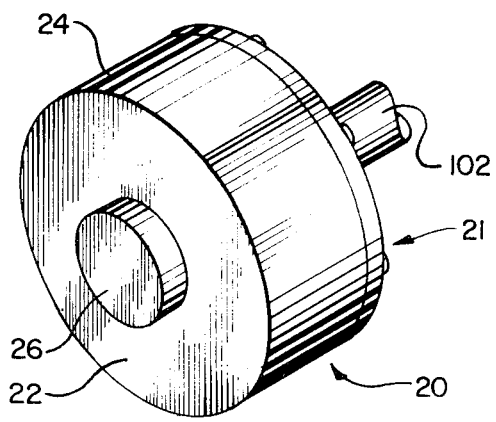
FIG. 2 is a perspective view similar to FIG. 1, showing the side and other end of the device.
Figure 3:
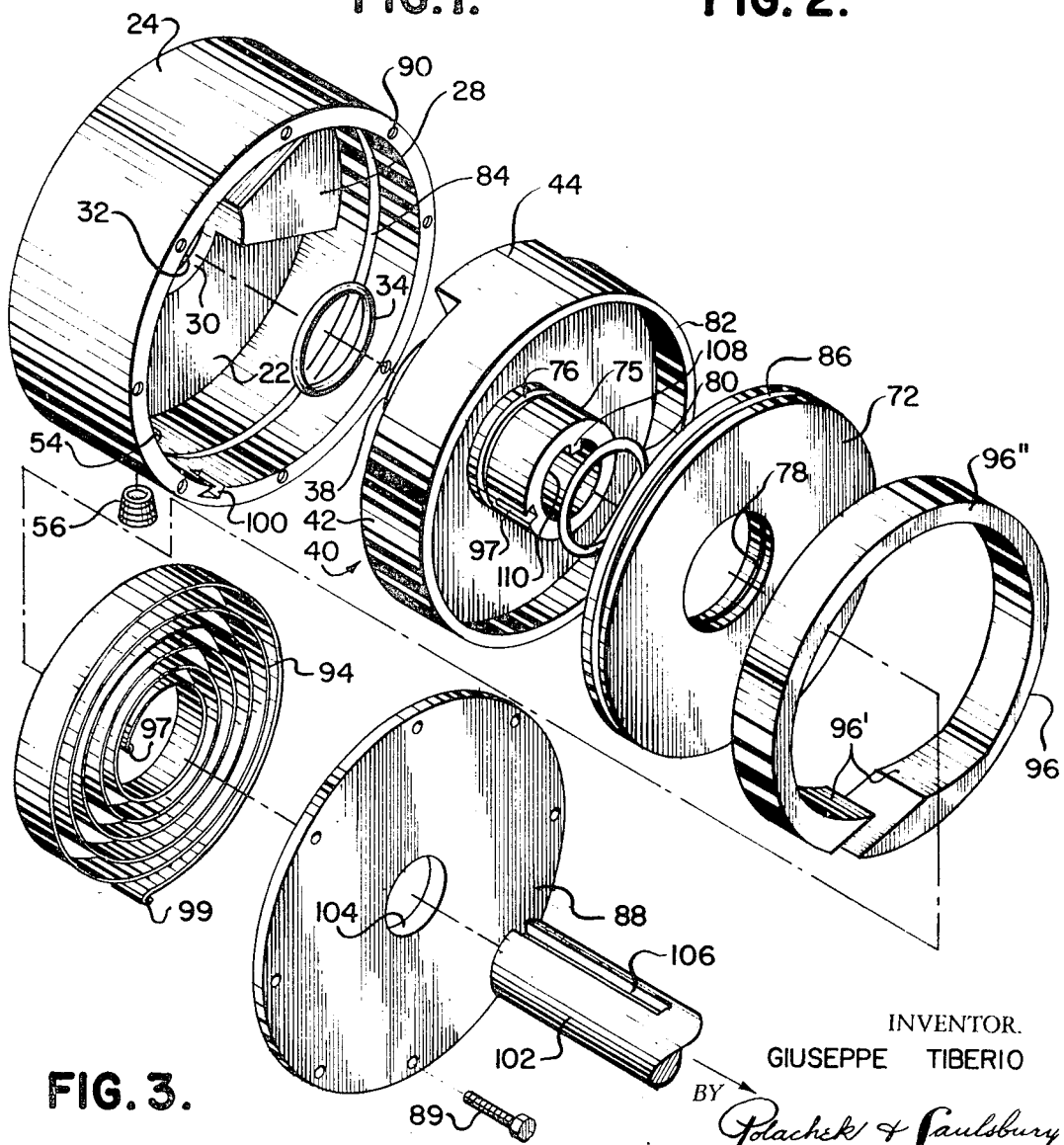
FIG. 3 is an exploded perspective view of parts of the coupling device.
Figure 4:
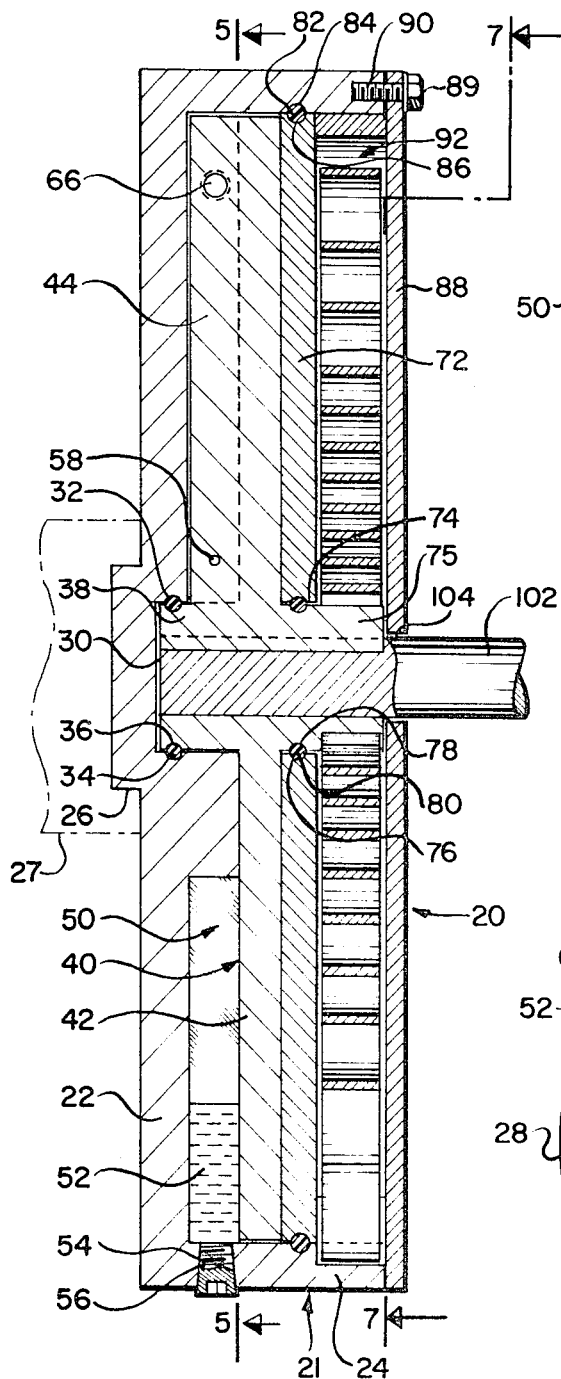
FIG. 4 is an enlarged axial sectional view taken on line 4—4 of FIG. 1.
Figure 6:
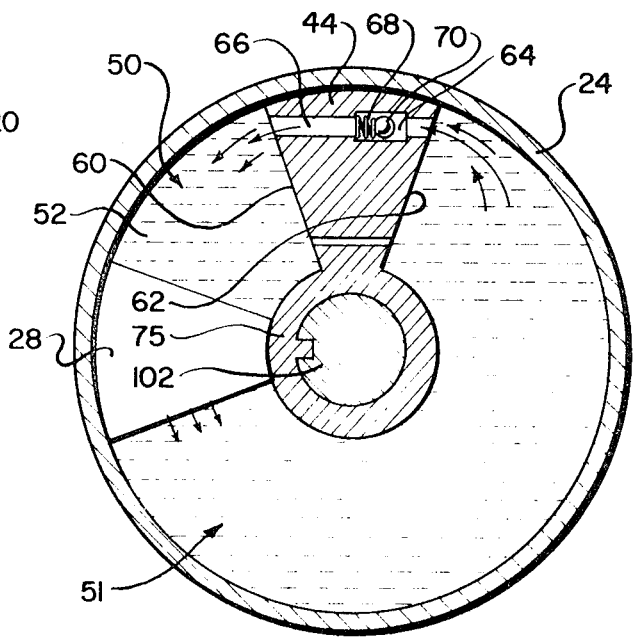
FIG. 6 is a cross sectional view similar to FIG. 5 showing the impeller and impelled members in a stopping position.

A drive shaft 102 is coupled to be impelled member 40. The shaft extends through hole 104 in plate 88. The coupled end of the shaft has a groove 106 which receives a key 108 formed on the inside of axial bore 110 in hub 75. FIGS. 1, 2 and 4 show the coupling device 20 completely assembled. FIGS. 5 and 6 illustrate the mode of operation of the coupling device.

In operation of the coupling device 20, it will be assumed that both the impeller and impelled members are at rest relative to each other with jaws 28 and 44 close to each other in the slightly spaced angular position shown in FIG. 5. Suppose now that the clutch or shaft 27 indicated by dotted lines FIG. 4 starts turning the impeller member 21 clockwise as viewed in FIG. 5. It will be apparent that initially fluid 52 will flow from chamber 50 through hole 58 from left side 60 to chamber 51 at the right side 62 of jaw 44. The fluid will be pushed by rotating jaw 28. Initially the impelled member 40 remains stationary. Gradually however, as the driving force of impeller member 21 increases the impelled member along with shaft 102 will start to turn, while tension in spring 94 increases as it is coiled clockwise as viewed in FIG. 7, at the end of relative clockwise rotation of jaw 28 it reaches position P spaced slightly to the left of jaw 64. At this time both the impeller and impelled members are rotating together while shaft 102 drives whatever load may be coupled to it.

Suppose now that the driving force exerted on impeller member 21 is cut off by opening the clutch coupled to it or by turning off the driving motor. The impelled member with shaft 102 will tend to continue rotating due to inertia. However, there will be no driving force exerted by the impeller so that spring 94 will begin to uncoil. The fluid 52 will be forced from chamber 51 through passage 66 as check valve 64 is forced open as shown in FIG. 6. The fluid will pass through quite rapidly from chamber 51 to chamber 50 at opposite sides of jaw 44 to refill chamber 50. The relative motion of jaw 28 will be counterclockwise with respect to jaw 44. Jaw 28 will return to its initial position shown in FIG. 5.

It will be understood that in both starting and stopping the impelled and impeller members begin their relative motions gradually, smoothly and progressively without imparting any shock to each other or to the associated mechanical transmission.

Figure 8:
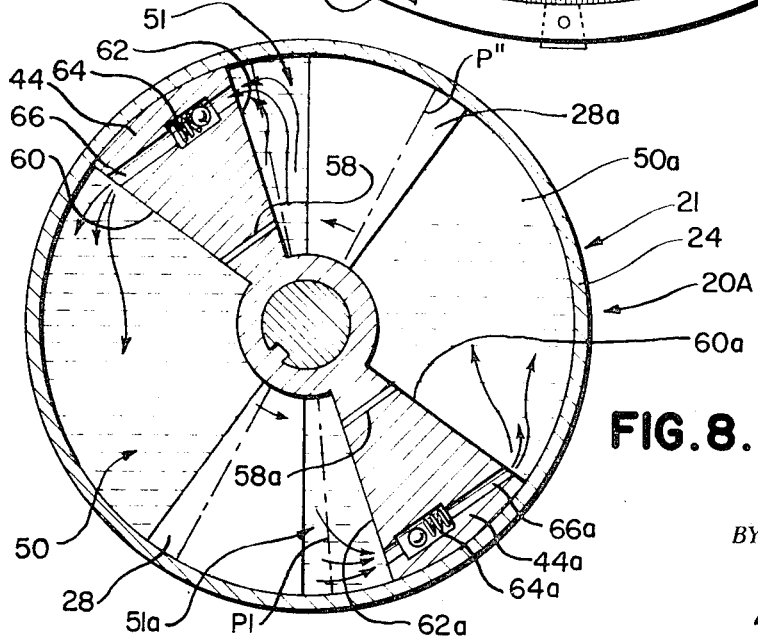
FIG. 8 is a cross sectional view similar to FIG. 6 showing double jaw construction for the impeller and impelled members.

FIG. 8 shows another embodiment of the invention in which coupling device 20A is constructed like device 20 and operates in a similar manner. Corresponding parts are identically numbered. In device 20A another jaw 28a is provided on impeller disc 22a diametrically opposite from jaw 28. Another jaw 44a is provided on impelled disc 40a diametrically opposite from jaw 44. In this arrangement there are four chambers 50, 50a and 51, 51a, containing fluid 52. An additional hole 58a is provided in jaw 44a and another check valve 70 in passage 66a. Since the structure is balanced, the split ring 96 employed in coupling device 20 is a perfect ring. In both cases, the ring is required to set the desired running fit between the impeller and impelled discs.

While starting jaw 28 drives fluid 52 from chamber 50 to chamber 51 via bore 58 as in device 20. At the same time jaw 28a drives fluid from chamber 50a to chamber 51a via bore 28a. During the stopping operation, jaw 28 drives fluid from chamber 51a into chamber 50a via check valve 64a in passage 66a, while jaw 28a drives fluid from chamber 51 into chamber 50 via check valve 64 in passage 66. Some fluid also passes via the narrow bores 58 and 58a but this is relatively small in quantity as compared with the amount passing through passages 66, 66a.

Device 20A is capable of heavier duty operation than device 20, since the jaws 28, 44 and 28a, 44a share the driving load. Relative rotation of the impeller and impelled members is limited to an angle of approximately 120°. In returning to the starting position jaws 28 and 28a reach positions P, P'' adjacent to jaws 44a, 44 near sides 62a, 62 respectively of these jaws. Since the impeller and impelled members rotate relatively to each other through smaller angles and pass smaller amounts of fluid through holes 58, 58a and passages 66, 66a, device 20A operates somewhat quicker than device 20. However, in both devices starting and stopping take place smoothly, gradually and progressively without shock. The devices operate entirely automatically.

While a limited number of embodiments of the invention have been described and illustrated it will be understood that many changes and modifications are possible. Materials, dimensions and shapes can be changed according to requirements.

What is claimed is:

1. A coupling device for progressively coupling a rotary drive member and a driven shaft, comprising an impeller member having a first circular disc to which said drive member can be axially coupled for rotating the impeller member, a cylindrical skirt integral with the periphery of said disc, and a first flat jaw on said disc inside said skirt; an impelled member comprising a second circular disc rotatably disposed in said impeller member, an axial hub on said disc for receiving and engaging a driven shaft, and a second jaw on the second disc coplanar with the first jaw, both discs defining with said skirt a first chamber between one side of the first jaw and one side of the second and a second chamber between the other side of the first jaw and the other side of the second jaw; a fluid filling both chambers; sealing means in said impeller member sealing said second disc against leakage of fluid from said chambers; a closure plate on said skirt defining a third chamber between said second disc and said closure plate; a spirally coiled spring in said third chamber connected at one end to said hub and at its other end to the inside of said skirt for yieldably holding said jaws in a predetermined angularly spaced first position in said impeller member, said second jaw having a narrow bore therein extending between opposite sides of the second jaw for passing said fluid therethrough from the first chamber to the second chamber; and means for coupling said driven shaft axially to said hub for rotating with the impelled member, whereby the drive member will be drivingly coupled to the driven shaft gradually, progressively and shocklessly, while said first jaw drives said fluid through said bore from the first chamber to the second chamber when the impeller member starts to rotate, and whereby the coil spring will be tensionally wound while the two jaws assume another angularly spaced position so that the impeller member and impelled member rotate together while driving force is applied by said drive member to the impeller member.

2. A coupling device as defined in claim 1, wherein said second jaw has a wide passage therein extending between opposite sides of the second jaw; and a one-way check valve in said passage to limit passage of fluid therethrough in only one direction from the second chamber to the first chamber while said coiled spring unwinds when driving force exerted upon said impeller member is relieved to restore the jaws to said first angularly spaced position.

3. A coupling device as defined in claim 1, further comprising a massive member in said impeller member arranged to balance the mass of said jaws when they are disposed adjacent to each other during rotation of the impelled member with the impeller member.

4. A coupling device as defined in claim 3, wherein said massive member is a ring with diametrically opposite portions of different thickness.

5. A coupling device as defined in claim 3, wherein said second jaw has a wide passage therein extending between opposite sides of the second jaw; and a one-way check valve in said passage to limit passage of fluid therethrough in only one direction from the second chamber to the first chamber while said coiled spring unwinds when driving force exerted upon said impeller member is relieved to restore the jaws to said first angularly spaced position.

6. A coupling device as defined in claim 1, wherein said sealing means comprising a ring having a central hole, said ring being disposed in said third chamber between said spring and said second disc, means sealing the periphery of said ring to said skirt and sealing the rim of said hole to said hub.

7. A coupling device as defined in claim 1, further comprising a third jaw integral with said first disc and diametrically opposite from the first jaw, and a fourth jaw integral with the second disc and diametrically opposite from the second jaw, said fourth jaw having a narrow second bore therein extending between opposite sides of the fourth jaw for passing said fluid therethrough whereby the third jaw will drive said fluid through the second bore and effect gradual progressive coupling of the drive member to the driven shaft in cooperation with the first and second jaws when the impeller member starts to rotate.

8. A coupling device as defined in claim 7, wherein said fourth jaw has a wide second passage therein extending between opposite sides of the fourth jaw, said coiled spring yieldably holding the third and fourth jaws in an initial angularly spaced position in the impeller member; and a second one-way check valve in said second passage to limit passage of fluid therethrough in only said one direction while the coiled spring unwinds when the driving force exerted upon said impeller member is relieved to restore the third and fourth jaws to said initial angularly spaced position, and while the third jaw drives the fluid through said second passage.

9. A coupling device as defined in claim 7, wherein all the jaws are sector shaped and substantially equal in size, so that the impeller and impelled members are dynamically balanced when they rotate together.

10. A coupling device as defined in claim 1, further comprising a fluid filler plug fitted in a lateral hole in said skirt for filling said first and second chambers with said fluid.

11. A coupling device as defined in claim 1, further comprising a following ring to set the optimum running fit between the impeller and impelled discs.

* * * * *